(12) United States Patent
Gummalla et al.

(10) Patent No.: US 8,825,457 B2
(45) Date of Patent: Sep. 2, 2014

(54) SYSTEMS AND METHODS FOR MATERIAL LIFE PREDICTION

(75) Inventors: Rakesh Gummalla, Oakley, OH (US); Mel Allende-Blanco, Loveland, OH (US); Matthew Joseph Macura, Loveland, OH (US); Richard George Coe, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 862 days.

(21) Appl. No.: 13/006,907

(22) Filed: Jan. 14, 2011

(65) Prior Publication Data

US 2012/0185224 A1 Jul. 19, 2012

(51) Int. Cl.
*G06G 7/48* (2006.01)
*G06F 17/50* (2006.01)
*G05B 17/02* (2006.01)
*G06Q 10/06* (2012.01)

(52) U.S. Cl.
CPC ............ *G06F 17/5018* (2013.01); *G05B 17/02* (2013.01); *G06Q 10/06* (2013.01); *G06F 2217/16* (2013.01); *G06F 17/5009* (2013.01); *G06F 2217/76* (2013.01)
USPC .......................................................... 703/6

(58) Field of Classification Search
CPC ............ G06F 17/5009; G06F 17/5018; G06F 2217/16; G06Q 10/06; G05B 17/02
USPC .......................................................... 703/6
See application file for complete search history.

(56) References Cited

U.S. PATENT DOCUMENTS

| | | | | |
|---|---|---|---|---|
| 5,136,497 A | * | 8/1992 | Coe et al. ..................... | 700/45 |
| 2005/0086034 A1 | | 4/2005 | Naito et al. | |

FOREIGN PATENT DOCUMENTS

| | | |
|---|---|---|
| JP | 2005049333 | 2/2005 |
| JP | 2005345413 | 12/2005 |
| JP | 2008286545 | 11/2008 |
| JP | 2009020065 | 1/2009 |
| JP | 2009020066 | 1/2009 |
| JP | 2009020067 | 1/2009 |

OTHER PUBLICATIONS

Lindley, P.B., et al., "Fatigue Resistance of Natural Rubber in Compression," Materials, Experimentation and Design in Fatigue, Proceedings of Fatigue 81, Warwick University, England (1981) pp. 337-351, Westbury House Publishers.
Gent, A.N., et al., "Fracture and Fatigue of Bonded Rubber Blocks Under Compression," Engineering Fracture Mechanics vol. 44 No. 6 pp. 843-855 (1993) Pergamon Press Ltd.

(Continued)

*Primary Examiner* — Saif Alhija
(74) *Attorney, Agent, or Firm* — Andres E. Velarde; Megan C. Hymore

(57) ABSTRACT

Included are embodiments for predicting an expected life of a pliable material. Some embodiments of a method include modeling, by a computing device, the pliable material and simulating strain on the pliable material, wherein simulating strain on the pliable material includes creating a strain results file. Similarly, some embodiments of the method include identifying, from the strain results file, a point of strain energy density on the pliable material, accessing a life prediction curve associated with the pliable material to determine a material file, and creating a strain-material file by combining the strain results file and the material file. Still some embodiments of the method include executing software to predict the expected life of the pliable material and predicting the expected life of the pliable material.

17 Claims, 6 Drawing Sheets

(56) References Cited

OTHER PUBLICATIONS

Luo, R.K., et al., "Fatigue design of Rubber springs used in rail vehicle suspensions," Proceedings of the Institution of Mechanical Engineers vol. 217(3) (2003) pp. 237-240, J. Rail and Rapid Transit, ProQuest Science Journals.

Luo, R.K., et al., "An approach to evaluate the service life of rubber springs used in rail vehicle suspensions," Proceedings of the Institution of Mechanical Engineers vol. 218(2) (2004) pp. 173-177, J. Rail and Rapid Transit, ProQuest Science Journals.

Kim, W.D., et al., "Fatigue Life Estimation of an Engine Rubber Mount," International Journal of Fatigue 26 (2004) pp. 553-560, Elsevier Ltd.

Woo, C.S., et al., "Fatigue Life Prediction of the Vulcanized Natural Rubber," Key Engineering Materials vol. 297-300 pp. 16-21 (2005) Trans Tech Publications, Switzerland.

Woo, C.S., et al., "A Study on the Fatigue Life Prediction and Evaluation of the Natural Rubber Components for Automobile Vehicles," Key Engineering Materials vol. 326-328 pp. 589-592 (2006) Trans Tech Publications, Switzerland.

Woo, C.S., et al., "Fatigue Life Evaluation of Rubber Components for Automobile Vehicle," Key Engineering Materials vol. 324-325 pp. 181-184 (2006) Trans Tech Publications, Switzerland.

Luo, R.K., et al., "Fatigue failure analysis of anti-vibration rubber spring," Engineering Failure Analysis 13 (2006) pp. 110-116, Elsevier Ltd.

Harbour, R.J., et al., "Fatigue crack growth of filled rubber under constant and variable amplitude loading conditions," The Authors, Journal Compilation, Fatigue Fract Engng Mater Struct 30 pp. 640-652 (2007) Blackwell Publishing Ltd.

Woo, C.S., et al., "A study on material properties and fatigue life prediction of natural rubber component," Materials Science and Engineering A 483-484 (2008) pp. 376-381, Elsevier Ltd.

Wang, Y., et al., "Fatigue life prediction of vulcanized natural rubber under proportional and non-proportional loading," The Authors, Journal Compilation, Fatigue Fract Engng Mater Struct 31 pp. 38-48 (2008) Blackwell Publishing Ltd.

Woo, C.S., et al., "Fatigue life prediction methodology of rubber components," High Performance Structures and Materials IV pp. 285-293 (2008) WIT Transactions on the Built Environment, vol. 97.

Li, Q., et al., "Fatigue Life Prediction of a Rubber Mount Based on Test of Material Properties and Finite Element Analysis," Engineering Failure Analysis 16 (2009) pp. 2304-2310, Elsevier Ltd.

Woo, C.S., "Fatigue life prediction of vulcanized natural rubber subjected to heat-aging," Procedia Engineering I (2009) pp. 9-12, Elsevier Ltd.

Samad, M.S.A., et al., "Simulation work of fatigue life prediction of rubber automotive components," $9^{th}$ National Symposium on Polymeric Materials (NSPM 2009), IOP Conf. Series: Materials Science and Engineering 11 (2010) 012009 pp. 1-6, IOP Publishing Ltd.

\* cited by examiner

SYSTEMS AND METHODS FOR MATERIAL LIFE PREDICTION

FIELD OF THE INVENTION

The present application relates generally to predicting life of a pliable material and specifically to utilizing a computing device to model and predict the life of the pliable material.

BACKGROUND OF THE INVENTION

In many processes, a pliable material may be utilized to perform a function. As the pliable material may receive strain and/or repeated pressure, the pliable material may be subject to deformation and, thus eventually to failure.

As an example, a pliable material may be utilized in an embossing process. During the embossing process, the pliable material may be subject to force exerted by a non-pliable body. As the embossing process repeatedly subjects the pliable material to the force, the pliable material may begin to fail. Because strain may be focused on one or more portions of the pliable material, the pliable material may fail in the region of the strain, while other regions may be free from such failure.

Similarly, a pliable material may be utilized for other processes, including rotary sealing, bonding, calendaring, other manufacturing processes, automotive processes, etc. In such scenarios, the pliable material may not only be subject to strain, but also environmental conditions that will also eventually cause failure.

SUMMARY OF THE INVENTION

Included are embodiments of a method for predicting an expected life of a pliable material. Some embodiments of the method include modeling, by a computing device, the pliable material and simulating strain on the pliable material, where simulating strain on the pliable material includes creating a strain results file. Similarly, some embodiments of the method include identifying, from the strain results file, at least one point of strain energy density on the pliable material, accessing a life prediction curve associated with the pliable material to determine a material file, and creating a strain-material file by combining the strain results file and the material file. Still some embodiments of the method include executing software to predict the expected life of one or more regions of the pliable material and predicting the expected life of the pliable material.

Also included are embodiments of a computing device. Some embodiments of the computing device include a memory component that stores a first program, a second program and a third program such that, when the third program is executed, the third program causes the computing device to electronically model the pliable material and electronically simulate strain on the pliable material, where electronically simulating strain on the pliable material includes creating a strain results file. Additionally, the third program may be configured to cause the computing device to identify, from the strain results file, at least one point of strain energy density on the pliable material. Similarly, the third program may cause the computing device to access a life prediction curve associated with the pliable material to determine a material file, create a strain-material file by combining the strain results file and the material file and predict the expected life of the pliable material.

Also included are embodiments of a non-transitory computer-readable medium. Some embodiments of the non-transitory computer-readable medium include a first program for modeling the pliable material, a second program for predicting the expected life of the pliable material, and a third program that, when the third program is executed, causes a computing device to model the pliable material and simulate strain on the pliable material, where simulating strain on the pliable material includes creating a strain results file. Similarly, in some embodiments, the third program causes the computing device to identify, from the strain results file, at least one point of strain energy density on the pliable material and access a life prediction curve associated with the pliable material to determine a material file. In still some embodiments, the third program causes the computing device to create a strain-material file by combining the strain results file and the material file and predict the expected life of the pliable material.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION OF THE INVENTION

Embodiments disclosed herein include systems and methods for predicting the life of a pliable material. In some embodiments a third computer program may cause a first computer program to model a pliable material of interest. The third computer program may further cause a second computer program to utilize data from the modeled pliable material for predicting at least one expected point of strain energy density and/or an expected life of the pliable material. Other embodiments are also disclosed.

Figure 1A:
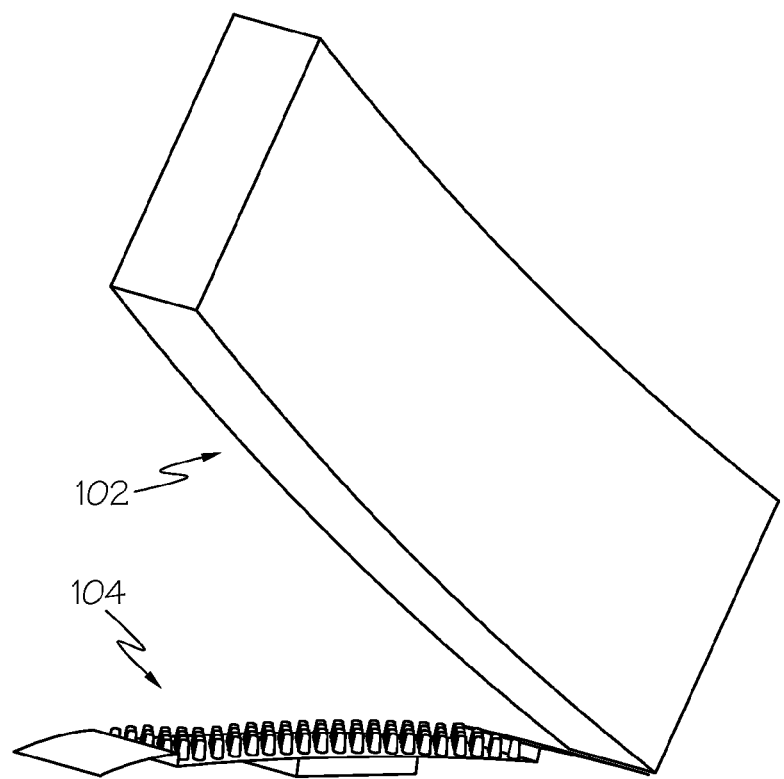
FIGS. 1A and 1B depict a pliable material that may be utilized in processing, such as in an embossing process, according to embodiments disclosed herein.
Figure 1B:
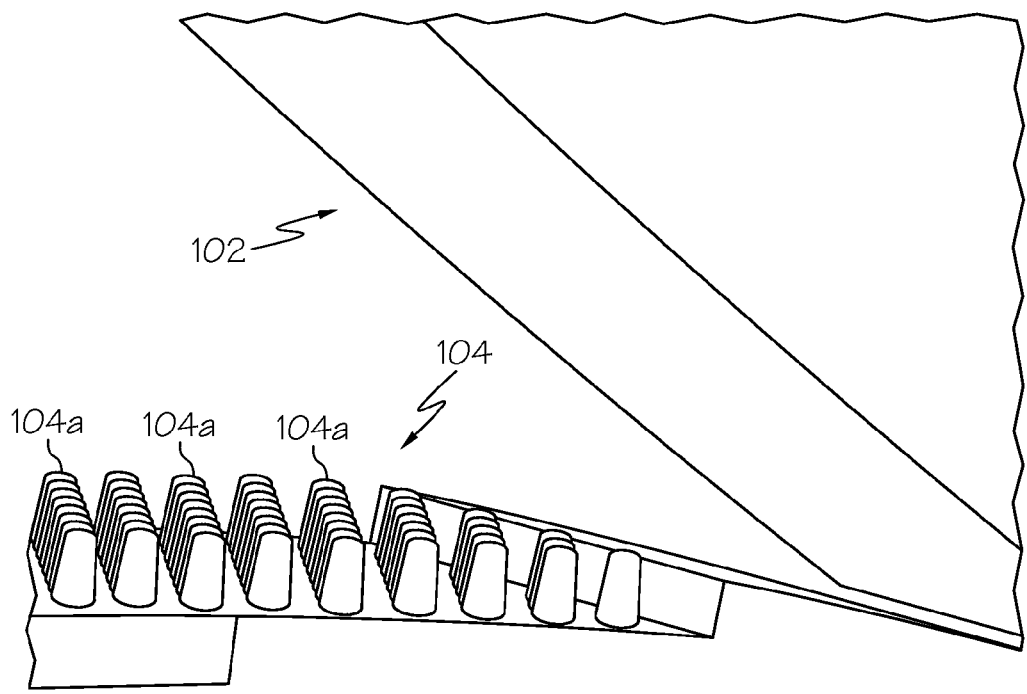

Referring now to the drawings, FIGS. 1A and 1B depict a pliable material 102 that may be utilized in processing, such as in embossing, rotary sealing, bonding, and calendaring and/or other processing, according to embodiments disclosed herein. As illustrated in FIG. 1A, the pliable material 102 may be utilized to emboss a sheet material, such as paper airlaid films for a feminine care product, paper towel, etc. During this process, the pliable material 102 may take the form of a roller, which is forced against a non-pliable material 104. By forcing the pliable material 102 against the non-pliable material 104 and sending the sheet material between the pliable material 102 and the non-pliable material 104, the sheet material may be embossed with the desired design. The force utilized for the embossing process may depend on the type of sheet material, the pliable material composition, the non-pliable material composition, and/or other factors. As the pliable material 102 may be in the shape of a roller, the pliable material 102 may be subject to strain at various regions. Other repetitive contacts such as rubber to rubber contact, rubber to woven belts contact, and rubber to polymeric belt contact can also be modeled.

Similarly, in FIG. 1B, the non-pliable material 104 is depicted with a plurality of pillars 104a. These pillars can be a single pillar pattern roll or multiple pillar patterns in a single roll. A pillar may include a structure with pillar height from about 10 microns to about 180 mm; have a pillar diameter (at half height) from about 5 microns to about 170 mm; have a pillar tip radius from about 2 microns to about 170 mm; have a pillar draft angle (or pillar draft angles) from about 0 degrees to about 80 degrees; and have a pillar spacing from about 5 microns to about 13 mm. The plurality of pillars 104a may be configured to facilitate the embossing process of the at least one sheets of material, but may also contribute to failure of the pliable material 102. As such, embodiments disclosed herein may be configured to determine the life of the pliable material 102, determine at least one predicted point of strain energy density of the pliable material 102, and thus determine alterations that can be made to the pliable material 102, the non-pliable material 104 and/or the pillars 104a to extend the life of the pliable material 102.

It should be understood that the pliable material 102 may be configured as any material that has a shore A value from about 0 to about 99.995 and that is subject to deformation, when pressure is applied. Examples of pliable materials are rubber materials, polymer materials, silicone materials, etc. Additionally, while in FIGS. 1A and 1B the pliable material 102 is illustrated as a single layer pliable material, this is merely an example. In some embodiments, the pliable material 102 is configured with a plurality of distinct layers, where each of the layers is constructed of a different material. The layers may each be pliable; however this is not a requirement, as in some embodiments at least one of the layers is constructed as a non-pliable material.

It should also be understood that the non-pliable material 104 may be constructed of any material that is not subject to regular failure and/or deformation, such as hard metals and/or hard polymers. While the non-pliable material may have pliable characteristics, relative to the pliable material 102, the non-pliable material may be considered rigid. It should also be understood that the examples of FIGS. 1A and 1B are merely exemplary in that they illustrate one embodiment of an embossing process. Other processes may be considered within the scope of this disclosure, which may or may not include the non-pliable material 104.

Figure 2:
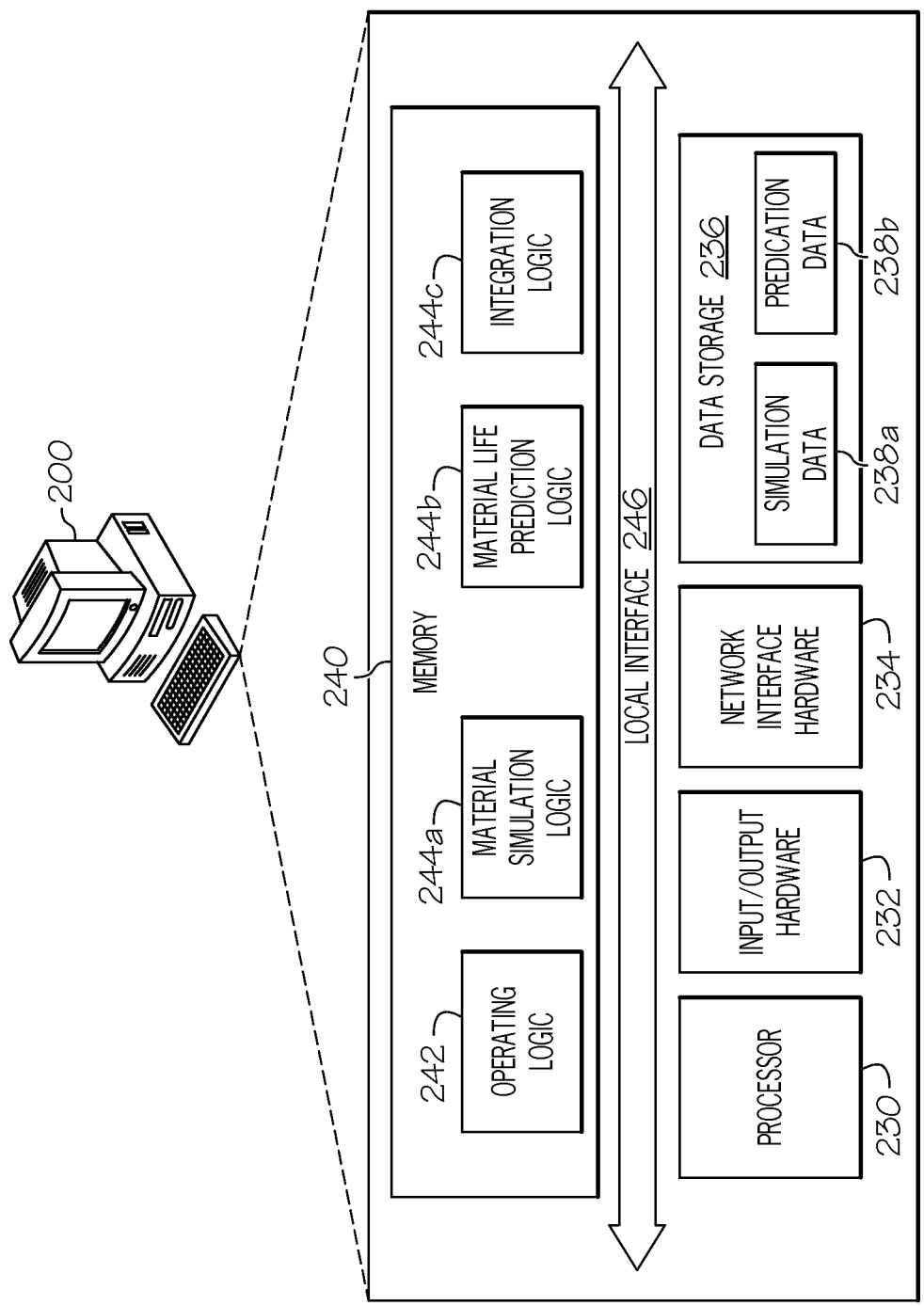
FIG. 2 depicts a computing device that may be utilized to predict the life of a pliable material, according to embodiments disclosed herein.

FIG. 2 depicts a computing device 200 that may be utilized to predict the life of the pliable material 102, according to embodiments disclosed herein. In the illustrated embodiment, the computing device 200 includes at least one processor 230, input/output hardware 232, network interface hardware 234, a data storage component 236 (which stores simulation data 238a, the prediction data 238b, and/or other data), and a memory component 240. The memory component 240 may be configured as volatile and/or nonvolatile memory and, as such, may include random access memory (including SRAM, DRAM, and/or other types of RAM), flash memory, secure digital (SD) memory, registers, compact discs (CD), digital video discs (DVD), and/or other types of non-transitory computer-readable mediums. Depending on the particular embodiment, these non-transitory computer-readable mediums may reside within the computing device 200 and/or external to the computing device 200.

Additionally, the memory component 240 may be configured to store operating logic 242, structure analysis logic 244a, material life prediction logic 244b, and integration logic 244c. The structure analysis logic 244a, the material life prediction logic 244b, and the integration logic 244c may each include a plurality of different pieces of logic, each of which may be embodied as a computer program, firmware, and/or hardware, as an example. A local interface 246 is also included in FIG. 2 and may be implemented as a bus or other interface to facilitate communication among the components of the computing device 200.

The processor 230 may include any processing component operable to receive and execute instructions (such as from the data storage component 236 and/or memory component 240). The input/output hardware 232 may include and/or be configured to interface with a monitor, positioning system, keyboard, mouse, printer, image capture device, microphone, speaker, gyroscope, compass, and/or other device for receiving, sending, and/or presenting data. The network interface hardware 234 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the computing device 200 and other computing devices. The processor may also include and/or be coupled to a graphical processing unit (GPU).

The operating logic 242 may include an operating system and/or other software for managing components of the computing device 200. Similarly, as discussed above, the structure analysis logic 244a may reside in the memory component 240 and may be configured to cause the processor 230 to receive information related to the pliable material 102 and electronically model the pliable material 102. The structure analysis logic 244a may be similar to the ABAQUS™, LS-DYNA™, ANSYS™, CODE_ASTER™ softwares and may be further configured to perform a finite element analysis to create a strain results file. Additionally, the material life prediction logic 244b may be similar to ENDURICA™ software and may be configured to utilize at least a portion of the data from the structure analysis logic 244a. The integration logic 244c may be configured to facilitate interaction between the structure analysis logic 244a, the material life prediction logic 244b, and/or perform other functions. As an example, the integration logic 244c may be configured to access pliable material data for submission and input this data into the structure analysis logic 244a. The integration logic 244c may also be configured to access a life prediction curve, such as a stress-to-failure (S-N) curve associated with the pliable material 102, receive a strain file from the material life prediction logic 244b, and create a strain-material file from the strain file and the material file. The integration logic 244c may also be configured to receive predicted life data from the material life prediction logic 244b and provide at least a portion of that data for output. Other functionality is also included and described in more detail, below.

It should be understood that the components illustrated in FIG. 2 are merely exemplary and are not intended to limit the scope of this disclosure. While the components in FIG. 2 are illustrated as residing within the computing device 200, this is merely an example. In some embodiments, one or more of the components may reside external to the computing device 200. It should also be understood that, while the computing device 200 in FIG. 2 is illustrated as a single device, this is also merely an example. In some embodiments, the structure analysis logic 244a, the material life prediction logic 244b, and the integration logic 244c may reside on different devices.

Additionally, while the computing device 200 is illustrated with the structure analysis logic 244a, the material life prediction logic 244b, and the integration logic 244c as separate logical components, this is also an example. More specifically, in some embodiments, a single piece of logic may perform the described functionality.

Figure 3:
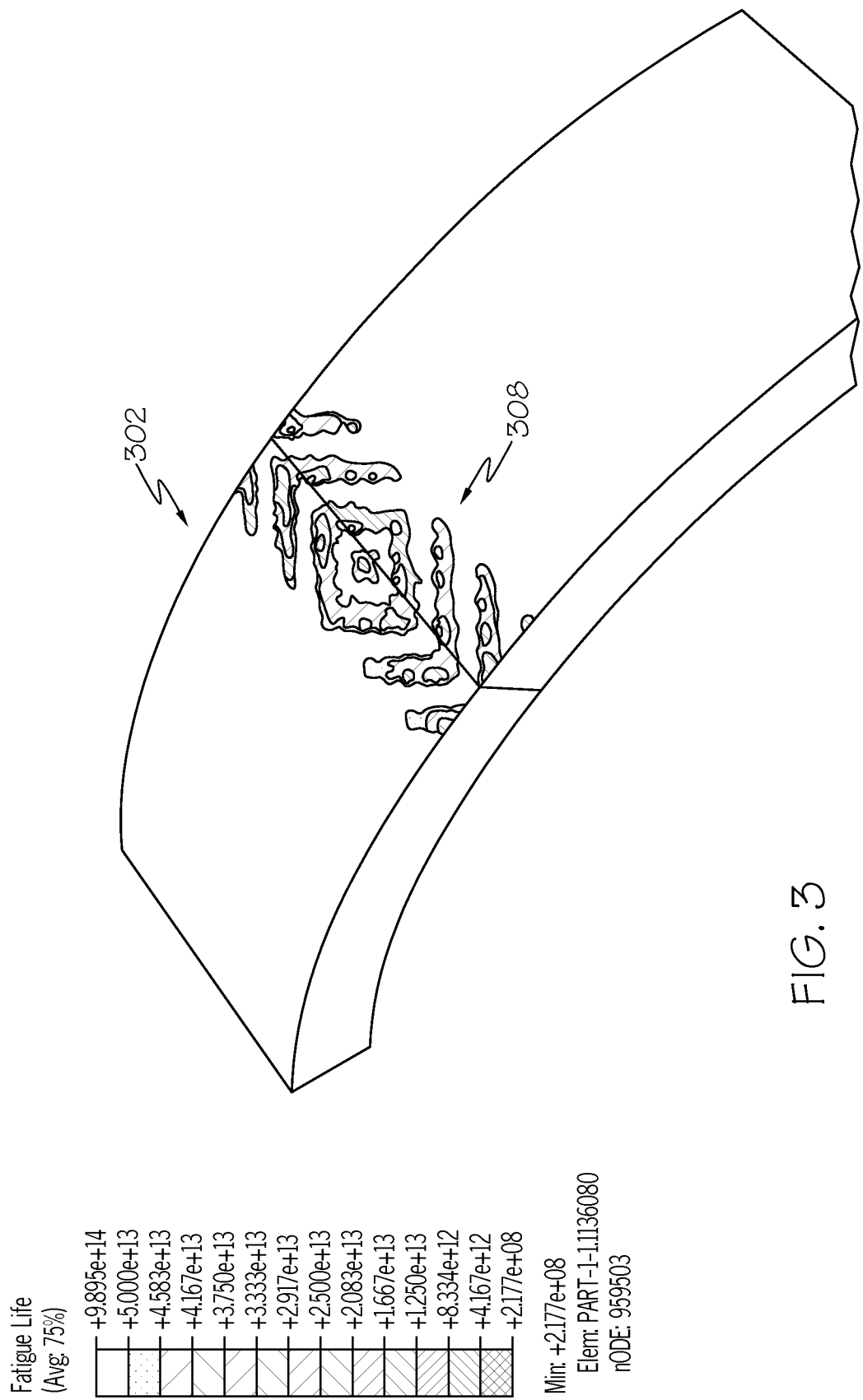
FIG. 3 depicts a simulated version of a pliable material, illustrating an expected life for the pliable material from FIGS. 1A and 1B, according to embodiments disclosed herein.

FIG. 3 depicts a simulated version of a pliable material 302a, illustrating an expected life for the pliable material 102 from FIGS. 1A and 1B, according to embodiments disclosed herein. As discussed above, the computing device 200 can model the pliable material 102 to create a strain file. As an example, data input for structure analysis logic 244a may include the geometry, material properties and loading conditions representing the actual process. Geometry and loading conditions data may be generated internally while the material properties can be obtained either internally or from an external source. The strain file may include strain data that indicates regions where strain is exerted on the pliable material 102. The strain data may be formatted into a strain file. The strain data may include a text file that contains numerical values of strains in different directions for each element in the model. Strain energy density may include one or more points and/or regions that are likely subject to failure, based on the modeled pliable material. Additionally, the computing device 200 can access a life prediction curve associated with the pliable material 102 to determine a material file. The life prediction curve can be obtained from open literature, if available, and/or generated with an external vendor. The axes of the curve are crack growth rate and/or stress on y-axis and crack driving force and/or number of cycles to failure on the x-axis. The material file may be determined from the life prediction curve automatically by the material life prediction logic 244b. The material file may include data regarding the pliable material, including modulus, initial flaw size, energy release rate, and the power law relationship of crack growth rate versus energy release rate. The computing device 200 may then create a strain-material file, which includes data from the strain file and the material file. The strain-material file may then be utilized to predict an expected life of one or more regions (and in some embodiments all regions) of the pliable material 102.

As illustrated in FIG. 3, the computing device 200 can utilize the strain-material file to predict the expected life of one or more areas of the pliable material 102 and may provide a visual representation of the simulated pliable material 302a that reflects this prediction. The prediction may be provided as a prediction overlay 308a on the simulated pliable material 302a to provide a visual representation of the expected life. As indicated above, this prediction may be facilitated via the material life prediction logic 244b and the integration logic 244c.

It should be understood that in some embodiments of an embossing process, as depicted in FIGS. 1A and 1B, only a portion of the rollers are modeled, since the objective is to analyze deformation of two rollers upon contact. In some embodiments, this analysis may not consider the effect of the sheet material and may ignore the viscoelasticity of the pliable material 102. These are expected to have small influence on the predicted strains. In some embodiments, the analysis also assumes that the properties and geometry of the pliable material 102 (and pillars 104a) are substantially consistent across the width and circumference of the roll.

Figure 4:
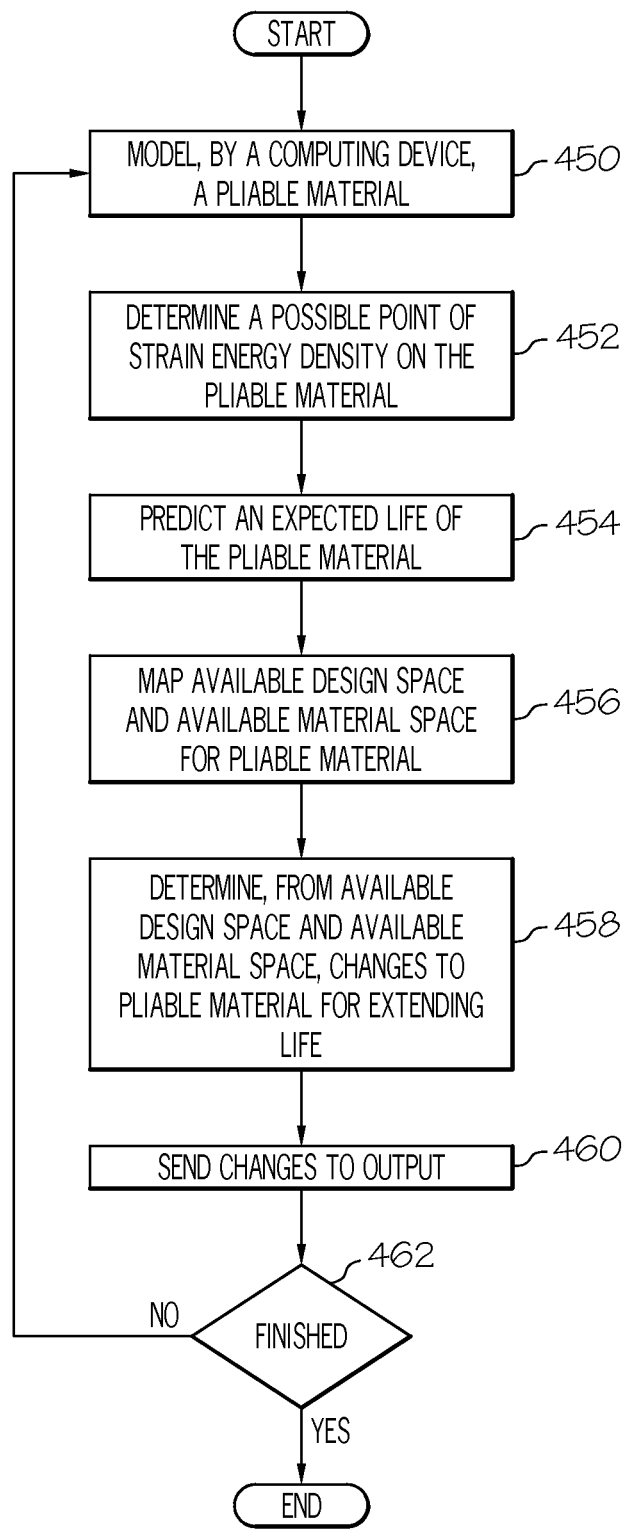
FIG. 4 depicts a process for predicting the life of a pliable material, according to embodiments disclosed herein.

FIG. 4 depicts a process for predicting the life of a pliable material, according to embodiments disclosed herein. As illustrated in block 450, the pliable material 102 can be modeled by a computing device 200. At block 452, a determination can be made regarding a possible point of strain energy density on the pliable material 102. At block 454, a prediction can be made regarding an expected life of the pliable material. At block 456 the available design space and available material space may be mapped for the pliable material 102. The design space refers to a pillar height from about 10 microns to about 180 mm; a pillar diameter (at half height) from about 5 microns to about 170 mm; a pillar tip radius in from about 2 microns to about 170 mm; pillar draft angles from about 0 degrees to about 80 degrees; spacing between pillars from about 5 microns to about 13 mm; a depth of engagement from about 0.1 mm to about 4 mm; and a rubber height from about 0.5 mm to about 30 mm. Similarly, the material space refers to rubber material property change. At block 458, a determination can be made from the available design space and the available material space (and/or an effect of available material space) regarding a procedure that may be implemented to extend the life of the pliable material 102. Depending on the process, the procedure may be changes in size of the pliable material 102, changes in shape of the pliable material, changes in size and/or shape of the non-pliable material, changes is density of pillars 104a, and/or other changes. At block 460, data related to the changes may be sent as output. At block 462 a determination can be made regarding whether the process is finished. If not, the process may return to block 450.

Figure 5:
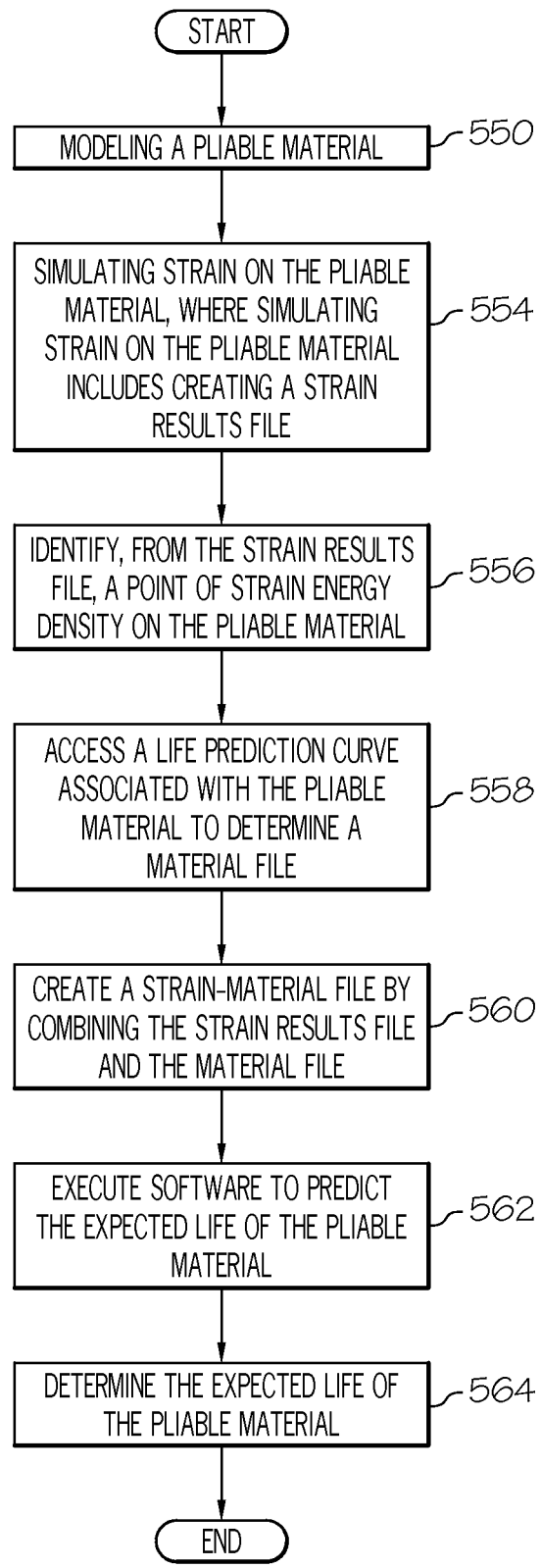
FIG. 5 depicts another process for predicting the life of a pliable material, according to embodiments disclosed herein.

FIG. 5 depicts another process for predicting the life of a pliable material, according to embodiments disclosed herein. As illustrated in block 550, the pliable material 102 may be modeled. At block 554, strain on the pliable material 102 may be simulated, where simulating strain on the pliable material 102 includes creating a strain results file. At block 556, a point of strain energy density on the pliable material 102 may be identified from the strain results file. At block 558, a life prediction curve associated with the pliable material 102 may be accessed to determine a material file. At block 560 a strain-material file may be created by combining the strain results file and the material file. At block 562, software (such as the material life prediction logic 244b) may be executed to predict the expected life of the pliable material 102. At block 564, the expected life of the pliable material 102 may be predicted and provided for output.

Figure 6:
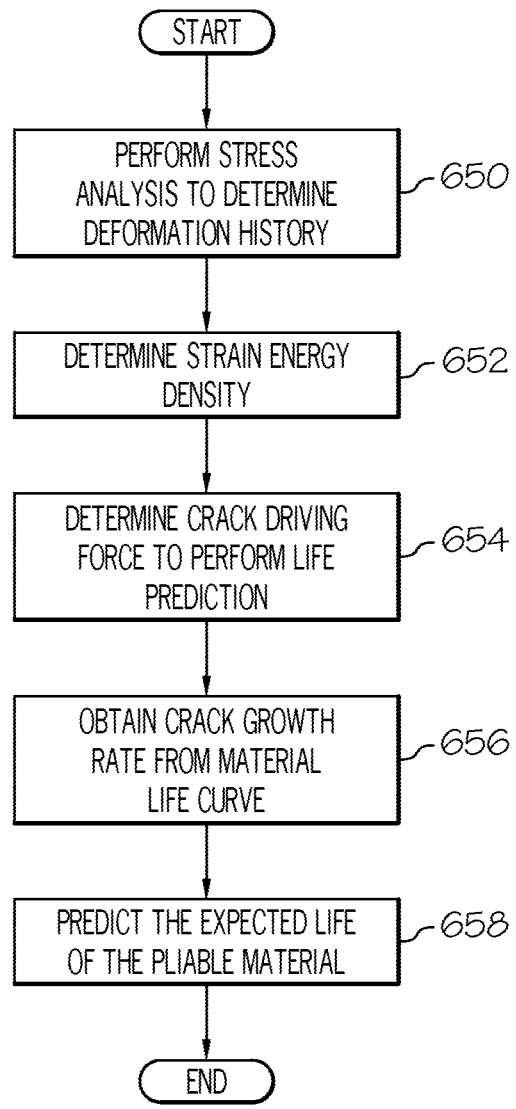
FIG. 6 depicts yet another process for predicting the life of a pliable material, according to embodiments disclosed herein.

FIG. 6 depicts yet another process for predicting the life of a pliable material, according to embodiments disclosed herein. As illustrated in block 650, stress analysis may be performed to determine a deformation history of the pliable material. As discussed above, the stress analysis may be performed by the structure analysis logic 244a. At block 652, the strain energy density may be determined. The strain energy density may be output from the structure analysis logic 244a and may include the area under a determined stress-strain curve, from the deformation history. At block 654, the crack driving force may be determined.

More specifically, this may be performed using a simple procedure and/or utilizing the material life prediction logic 244b. When utilizing the simple procedure, the strain energy density output may be utilized from the structure analysis logic 244a as the crack driving force. This may be valid on simple tension and small strains. When utilizing the material life prediction logic 244b, crack driving force is considered, due to tensile and shear components, by calculating crack energy density. This process involves both multiple deformation modes and high strains. The material life prediction logic 244b may also compute crack driving force at a plurality of planes at a location to determine a plane with the highest crack driving force. Regardless if the simple process or the material life prediction logic 244b is utilized, a value is assumed for the threshold crack driving force below which no crack growth occurs, as well as a value for a critical crack driving force, above which crack growth rate is infinite.

At block 656, crack growth rate is obtained for the material life curve. More specifically, once crack driving force is calculated the crack growth rate (in units of m/cycle) is obtained from a material life curve that provides a relationship between the crack driving force and the crack growth rate. At block 658, once crack growth rate is obtained, an expected life may be predicted by assuming that the process reaches the end of life at a certain crack size and then computing the number of cycles to reach this crack size.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be understood to those skilled in the art that various other changes and modifications can be made without departing from the spirit and scope of the invention. It is therefore intended to cover in the appended claims all such changes and modifications that are within the scope of this invention.

What is claimed is:

1. A method for predicting an expected life of a pliable material, comprising:
    modeling, by a computing device, the pliable material;
    simulating a strain on the pliable material, wherein simulating strain on the pliable material includes creating a strain results file;
    identifying, from the strain results file, at least one point of strain energy density on the pliable material;
    accessing a life prediction curve associated with the pliable material to determine a material file;
    creating a strain-material file by combining the strain results file and the material file;
    executing software to predict the expected life of the pliable material;
    predicting the expected life of the pliable material; and
    determining an effect of an available design space to determine a procedure for increasing the expected life of the pliable material, wherein the available design space includes a pillar height from about 10 microns to about 180 mm, a diameter from about 5 microns to about 170 mm, a tip radius from about 2 microns to about 170 mm, a draft angle from about 0 degrees to about 80 degrees, and a pillar spacing from about 5 microns to about 13 mm.

2. The method of claim 1, wherein the pliable material includes at least one of the following: a rubber material, a polymer material, and a silicone material.

3. The method of claim 1, further comprising predicting an expected life of all regions on the pliable material and wherein identifying the at least one point of strain energy density comprises utilizing a finite element analysis on the pliable material.

4. The method of claim 1, further comprising determining an effect of available material space to determine a procedure for increasing the expected life of the pliable material.

5. The method of claim 1, wherein the pliable material is utilized in at least one of the following processes: embossing, rotary sealing, bonding, and calendaring.

6. The method of claim 1, wherein the pliable material comprises a plurality of distinct layers.

7. A computing device for predicting an expected life of a pliable material, comprising:
    a memory component that stores a first program, a second program, and a third program such that, when the third program is executed, the third program causes the computing device to perform the following:
    electronically model the pliable material;
    electronically simulate strain on the pliable material, wherein electronically simulating strain on the pliable material includes creating a strain results file;
    identify, from the strain results file, a point of strain energy density on the pliable material;
    access a life prediction curve associated with the pliable material to determine a material file;
    create a strain-material file by combining the strain results file and the material file; and
    predict the expected life of the pliable material;
    wherein the pliable material has a shore A value ranging from about 0 to about 99.995 and includes at least one of the following: a rubber material, a polymer material, and a silicone material.

8. The computing device of claim 7, wherein the third program further causes the computing device to predict an expected life of all regions on the pliable material, and wherein identifying the point of strain energy density comprises utilizing a finite element analysis on the pliable material.

9. The computing device of claim 7, wherein the third program further causes the computing device to determine an effect of an available design space to determine a procedure for increasing the expected life of the pliable material, wherein the available design space includes a pillar height from about 10 microns to about 180 mm, a diameter from about 5 microns to about 170 mm, a tip radius from about 2 microns to about 170 mm, a draft angle from about 0 degrees to about 80 degrees, and a pillar spacing from about 5 microns to about 13 mm.

10. The computing device of claim 7, wherein the third program further causes the computing device to determine an effect of available material space to determine a procedure for increasing the expected life of the pliable material.

11. The computing device of claim 7, wherein the pliable material is utilized in at least one of the following processes: embossing, rotary sealing, bonding, and calendaring.

12. The computing device of claim 7, wherein the pliable material comprises a plurality of distinct layers.

13. A non-transitory computer-readable medium for predicting an expected life of a pliable material that stores a first program for modeling the pliable material, a second program for predicting the expected life of the pliable material, and a third program that, when the third program is executed, causes a computing device to perform the following:

model the pliable material;

simulate strain on the pliable material, wherein simulating strain on the pliable material includes creating a strain results file;

identify, from the strain results file, a point of strain energy density on the pliable material;

access a life prediction curve associated with the pliable material to determine a material file;

create a strain-material file by combining the strain results file and the material file; and predict the expected life of the pliable material;

wherein the third program further causes the computing device to determine an effect of an available design space to determine a procedure for increasing the expected life of the pliable material, wherein the available design space includes a pillar height from about 10 microns to about 180 mm, a diameter from about 5 microns to about 170 mm, a tip radius from about 2 microns to about 170 mm, a draft angle from about 0 degrees to about 80 degrees, and a pillar spacing from about 5 microns to about 13 mm.

14. The non-transitory computer-readable medium of claim 13, wherein the pliable material includes at least one of the following: a rubber material, a polymer material, and a silicone material.

15. The non-transitory computer-readable medium of claim 13, wherein the third program further causes the computing device to determine an effect of available material space to determine a procedure for increasing the expected life of the pliable material.

16. The non-transitory computer-readable medium of claim 13, wherein the pliable material includes a plurality of distinct layers.

17. The non-transitory computer-readable medium of claim 13, wherein the pliable material is utilized in at least one of the following processes: embossing, rotary sealing, bonding.

* * * * *